United States Patent [19]

Takahashi

[11] Patent Number: 5,096,338
[45] Date of Patent: Mar. 17, 1992

[54] THROW AWAY INSERT
[75] Inventor: Nobuhiro Takahashi, Itami, Japan
[73] Assignee: Sumitomo Electric Industries, Ltd., Osaka, Japan
[21] Appl. No.: 596,085
[22] Filed: Oct. 11, 1990
[30] Foreign Application Priority Data
  Oct. 11, 1989 [JP] Japan ............... 1-119436[U]
[51] Int. Cl.⁵ .................................. B26D 1/00
[52] U.S. Cl. ........................ 407/114; 407/116
[58] Field of Search ............ 407/113, 114, 115, 116, 407/117

[56] References Cited

U.S. PATENT DOCUMENTS

| 3,395,434 | 8/1968  | Wirfelt   | 407/114 |
| 3,487,515 | 1/1970  | Contrucci | 407/114 |
| 4,065,223 | 12/1977 | Nelson    | 407/114 |
| 4,214,847 | 7/1980  | Kraemer   | 407/114 |
| 4,215,957 | 8/1980  | Holma     | 407/114 |
| 4,273,480 | 6/1981  | Shirai    | 407/114 |
| 4,335,984 | 6/1982  | Zweekly   | 407/114 |
| 4,880,338 | 11/1989 | Stashko   | 407/114 |

Primary Examiner—Bruce M. Kisliuk
Assistant Examiner—John Marlott
Attorney, Agent, or Firm—Wenderoth, Lind & Ponack

[57] ABSTRACT

A throw-away insert having straight cutting edges defined adjacent the periphery thereof, arcuately curved corner portions extending between adjacent ones of the cutting edges, and a rake face having a center land. In the rake face, chip breaker grooves are formed near the corner portions. Each breaker groove adjoins the center land along a line inclined with respect to one of the adjacent cutting edges and is inclined with respect to the direction of thickness of the insert. An ellipsoidal recess is formed in the bottom surface of each breaker groove across the boundary between the center land and the breaker groove. The ellipsoidal recesses have a major axis extending parallel to the borderline between the center land and the breaker groove.

3 Claims, 2 Drawing Sheets

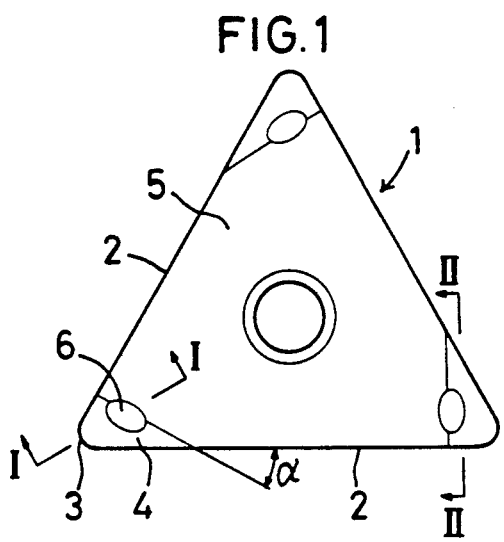
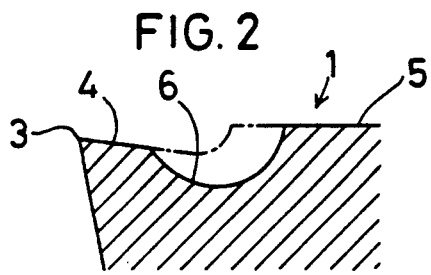
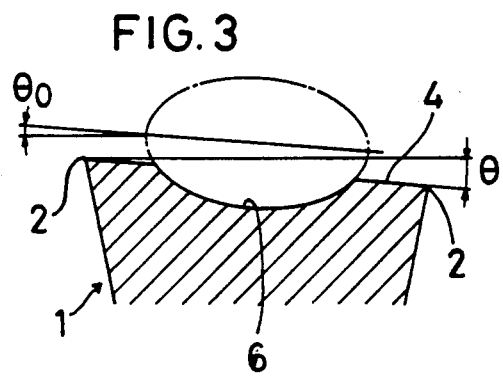
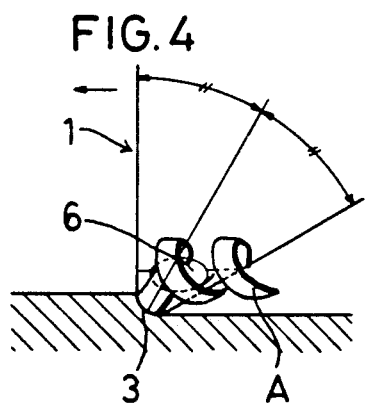
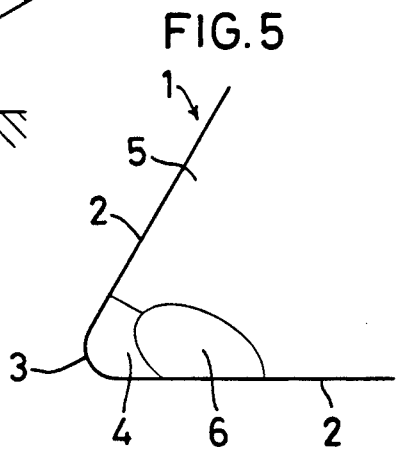
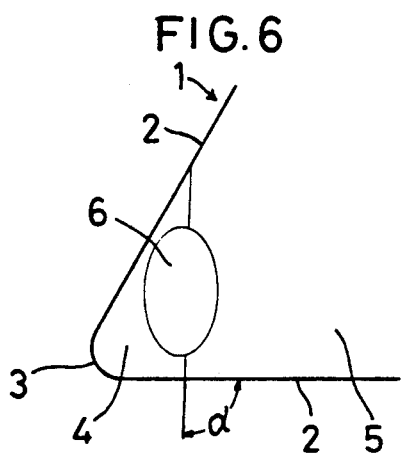
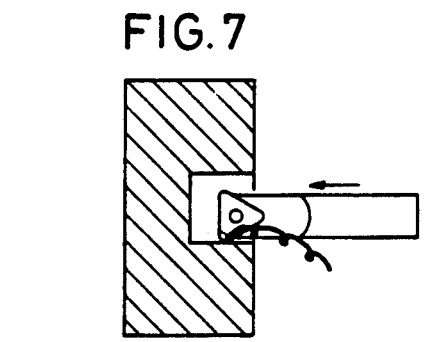
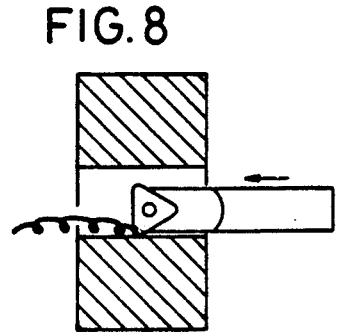

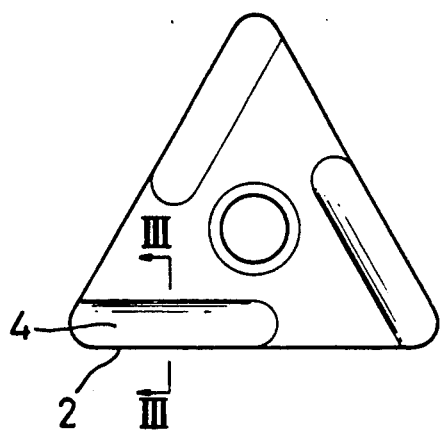
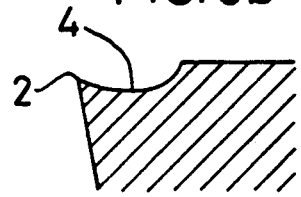
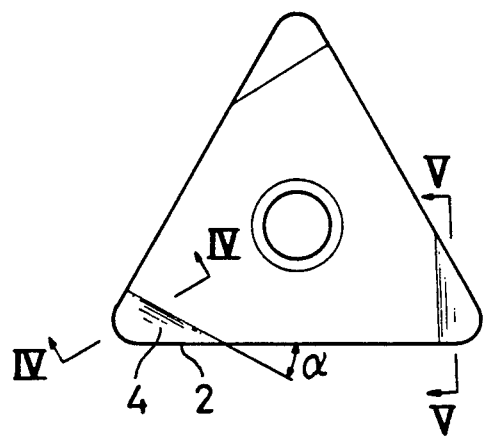
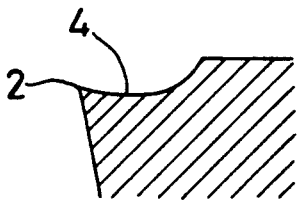
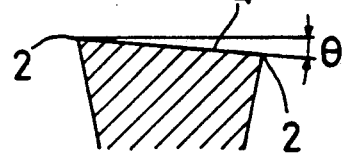
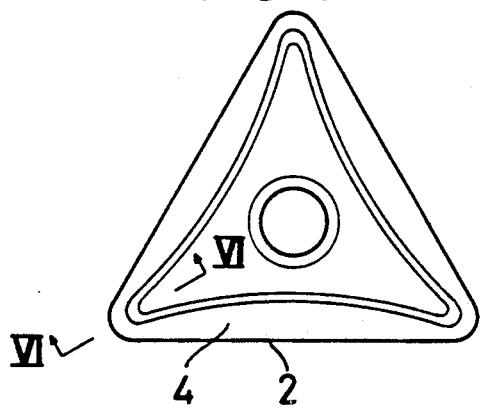
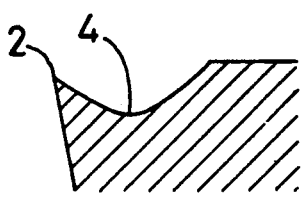

THROW AWAY INSERT

BACKGROUND OF THE INVENTION

This invention relates to a throw-away insert having a chip breaker effecting an improved disposal of chips from a machined surface.

With an increasing tendency toward unmanned machining, the importance of chip disposal is increasing. Namely, because the depth of cut is small in finish cutting, the chips tend to be long. Such chips may make it difficult for a robot hand to attach and detach tools and workpieces or may clog a conveyor, thereby hampering the unmanned operation.

But it is not easy to eliminate such difficulties because in finish cutting, the requirements for the surface roughness and dimensional accuracy are very high.

For example, if priority is given to breaking chips, there is known a method of forcibly cutting and breaking chips by providing the breaker wall as near to the tip of the cutting edge as possible. But in such a case, the material machined develops so-called "plucking" and chattering, thereby lowering the surface roughness. Also, because of increased cutting resistance, the dimensional accuracy as well as the tool life are diminished.

As will be apparent from the above discussion, in the unmanned finish cutting operation, it is necessary to solve the above-described two problems simultaneously. But this requirement cannot be met by any of the conventional chip breakers used in finish cutting such as small-diameter boring, e.g. the breakers shown in FIGS. 9a and 9b and in FIGS. 10a to 10c, and the breakers shown in FIGS. 11a and 11b having a groove formed by a die so as to extend all the way around the insert.

If it is impossible to break chips, the best way to dispose of the chips is to curl them into as small of pieces as possible and stably discharge them in such a direction as not to become tangled.

In this respect, the conventional breakers shown in FIGS. 9 and 11 are not desirable because they cannot forcibly discharge chips in a predetermined direction and thus the direction in which the chips flow after clearing the breaker tends to be unpredictable.

The breaker shown in FIG. 10 does produce a chip guiding effect because a breaker groove 4 is defined by a surface inclined downwardly toward front cutting edge 2 at an angle $\Theta$. But because the strength of the breaker at edge 2 tends to drop with an increase in the angle $\Theta$, the maximum allowable value for $\Theta$ is rather small. Thus it is difficult to reliably control the flow of chips.

SUMMARY OF THE INVENTION

It is an object of this invention to provide an insert having a breaker which can dispose of chips in a desirable manner.

According to this invention, there is provided a throw-away insert having straight cutting edges, arcuately curved noses at corner portions disposed between adjacent ones of the cutting edges, and a rake face defining a center land and chip breaker grooves at the corner portions, each of the breaker grooves adjoining the center land along a respective line intersecting one of the adjacent cutting edges at an angle $\alpha$, each of the breaker grooves being defined by a surface downwardly toward the one of the adjacent cutting edges at an angle $\Theta$ with respect to a horizontal plane, and ellipsoidal recesses formed in the rake face across the boundary between the center land and the breaker grooves, each of the recesses being defined by a surface in the shape of a part of an ellipsoid having a major axis extending parallel, as viewed from top, to the borderline between the center land and the respective breaker groove.

The ellipsoidal recesses may be formed in such a way as to intersect the cutting edge located downstream thereof with respect to the direction in which chips flow. Also, they may have their major axes inclined at an angle equal to or larger than the angle $\Theta$ with respect to the direction of thickness of the insert.

The chips pass over the surface defining the breaker groove and enter the ellipsoidal recess, where they are subjected to strain and curl. They curl reliably and smoothly because the recess is defined by an arcuate surface and the chips are subjected to strain at a portion more remote from the cutting edge than is the uprising portion of the breaker groove. Thus, the surface roughness and dimensional accuracy are not badly affected, which is inevitable when the chips are forcibly broken.

Further, because the breaker groove is inclined downwardly with respect to the direction in which chips flow, the flow of chips is forcibly directed obliquely downwardly of the inclined surface.

According to this invention, by forming a chip breaker with a breaker groove and an ellipsoidal recess in the rake face at each corner, chips can be curled reliably and smoothly and discharged stably in a predetermined direction. Thus, the throw-away insert according to this invention performs with a high cutting accuracy, prevents the tangling of chips and is especially suited for use in finish cutting such as small-diameter boring.

BRIEF DESCRIPTION OF THE DRAWINGS

Other features and objects of the present invention will become apparent from the following description taken with reference to the accompanying drawings, in which:

FIG. 1 is plan view of a first embodiment of a throw-away insert according to the present invention;

FIG. 2 is a sectional view taken along line I—I of FIG. 1;

FIG. 3 is a sectional view taken along line II—II of FIG. 1;

FIG. 4 is schematic view illustrating the operation of the breaker;

FIGS. 5 and 6 are plan views of portions of other embodiments of a throw-away insert according to the present invention;

FIGS. 7 and 8 are schematic views showing how boring is performed;

FIG. 9a is a plan view of a prior art throw-away insert;

FIG. 9b is a sectional view taken along line III—III of FIG. 9a;

FIG. 10a is a plan view of another prior art insert;

FIG. 10b is a sectional view taken along line IV—IV of FIG. 10a;

FIG. 10c is a sectional view taken along line V—V of FIG. 10a;

FIG. 11a is a plan view of a further prior art insert; and

FIG. 11b is a sectional view taken along line VI—VI of FIG. 11b.

DETAILED DESCRIPTION OF THE PREFERRED EMBODIMENTS

Now the embodiments of this invention will be described with reference to the accompanying drawings. In FIG. 1, numeral 1 generally designates a throw-away insert according to this invention. It has straight cutting edges 2 in the form of a ridge defined between a rake face and side faces of the insert. Corner or nose portions 3 located between the adjacent cutting edges 2 are curved arcuately. A chip breaker groove 4 is formed in the rake face at each corner portion of the insert. The breaker grooves 4 adjoin a center land 5 of the rake face along lines inclined at an angle $\alpha$ with respect to the cutting edge 2 located rearwardly with respect to the feed direction as viewed in FIG. 4. The angle $\alpha$ should be 10° or more. Also the grooves 4 are inclined downwardly toward the cutting edge 2 located rearwardly with respect to the feed direction at an angle $\Theta$ with respect to a horizontal plane, i.e. a plane extending transversely to the thickness-wise direction of the insert (see FIG. 3).

An ellipsoidal recess 6 is formed at the boundary between the center land 5 and each breaker groove 4 so as to intersect the bisector of the angle subtended by the corner portion.

Each ellipsoidal recess 6 is defined by a surface of the insert in the shape of a part of an ellipsoid having a major axis extending parallel, as viewed from the top, to the borderline between the center land and the respective breaker groove. The recess 6 is inclined downwardly toward the cutting edge 2 located rearwardly with respect to the feed direction at an angle equal to or larger than the angle $\Theta$ with respect to the horizontal plane.

Next, the operation of the chip breaker will be described.

Because the depth of cut is extremely small during finish cutting, as shown in FIG. 4, chips A produced near the nose portion or corner portion 3 tend to move in a direction along the bisector of the angle subtended by the adjacent cutting edges 2.

The chips then pass along the surface defining the breaker groove 4 and enter the ellipsoidal recess 6 located downstream of the groove 4. The chips are curled reliably by the arcuate surface defining the recess 6. The chips thus curled are guided by the surface defining the recess 6 so as to be discharged rearwardly with respect to the direction of feed (shown by the arrow in FIG. 4), due to the fact that the major axis of the recess 6 is inclined at an angle $\Theta_0$.

FIG. 5 shows the second embodiment of this invention. In this embodiment, there is no cutting edge 2 where the breaker groove 4 is shallowest owing to the ellipsoidal recess 6. This arrangement is effective particularly when the feed rate is high, i.e. when the chips produced are thick and thus require a large chip curling force.

In the embodiment shown in FIG. 6, the angles of inclination $\alpha$ and $\Theta$ of the breaker grooves 4 and the angles of inclination $\Theta_0$ of the ellipsoidal recesses 6 are opposite in direction to those in the embodiment of FIG. 1.

When boring a blind hole as shown in FIG. 7, chips are discharged through the end of the hole through which the breaker is inserted. In boring a through-hole as shown in FIG. 8, chips should be discharged through the end opposite that through which the breaker is inserted in order to prevent the finished surface from being damaged by the chips. The embodiment shown in FIG. 6 is intended specifically for this type of cutting operation. The angle $\alpha$ in this case should be 100° or less.

The angle $\Theta$ should be within such a range as not to impair the strength of the cutting edge. Even if the angle is limited to a rather small value, chips can be discharged in a stable direction according to this invention, due to the surface defining the recess 6 having an angle of inclination equal to or larger than $\Theta$.

This invention is applicable not only to triangular inserts as shown but also to other types of inserts.

What is claimed is:

1. A throw-away insert having straight cutting edges defined at the periphery thereof, an arcuately curved corner portion extending between adjacent ones of said cutting edges, and a rake face having a center land and a chip breaker groove extending therein at said corner portion, said breaker groove terminating at said center land along a boundary line intersecting one of the adjacent cutting edges at an angle $\alpha$, said breaker groove being defined by a surface of the insert inclined downwardly toward said one of the adjacent cutting edges at an angle $\Theta$ with respect to a plane extending transversely to the thickness-wise direction of the insert, and a recess extending in said rake face across the boundary line between said center land and said breaker groove, said recess being defined by a surface in the shape of a part of an ellipsoid having a major axis extending parallel, as viewed from above said rake face, to said boundary line between said center land and said breaker groove, and said recess extending to the periphery of the insert such that said one of the adjacent cutting edges is intersected by the recess so as not to be present at that part of the periphery to which said recess extends.

2. A throw-away insert as claimed in claim 1, wherein the major axis is inclined downwardly toward said one of the adjacent cutting edges at an angle equal to or larger than said angle $\Theta$ with respect to said plane.

3. A throw-away insert having straight cutting edges defined at the periphery thereof, an arcuately curved corner portion extending between adjacent ones of said cutting edges, and a rake face having a center land and a chip breaker groove extending therein at said corner portion, said breaker groove terminating at said center land along a boundary line intersecting one of the adjacent cutting edges at an angle $\alpha$, said breaker groove being defined by a surface of the insert inclined downwardly toward said one of the adjacent cutting edges at an angle $\Theta$ with respect to a plane extending transversely to the thickness-wise direction of the insert, and a recess extending in said rake face across the boundary line between said center land and said breaker groove, said recess being defined by a surface in the shape of a part of an ellipsoid having a major axis extending parallel, as viewed from above said rake face, to said boundary line between said center land and said breaker groove, the major axis being inclined downwardly toward said one of the adjacent cutting edges at an angle equal to or larger than said angle $\Theta$ with respect to said plane.

* * * * *